US009083419B2

(12) United States Patent
Alexander et al.

(10) Patent No.: US 9,083,419 B2
(45) Date of Patent: Jul. 14, 2015

(54) ESTIMATION OF A MULTIPATH SIGNAL IN A WIRELESS COMMUNICATION SYSTEM

(75) Inventors: Paul Dean Alexander, Kent Town (AU); Nick Letzepis, Kent Town (AU); Alexander James Grant, Kent Town (AU); David Victor Lawrie Haley, Kent Town (AU)

(73) Assignee: Cohda Wireless Pty. Ltd. (AU)

( * ) Notice: Subject to any disclaimer, the term of this patent is extended or adjusted under 35 U.S.C. 154(b) by 0 days.

(21) Appl. No.: 13/805,234

(22) PCT Filed: Jun. 24, 2011

(86) PCT No.: PCT/AU2011/000782
§ 371 (c)(1),
(2), (4) Date: Dec. 18, 2012

(87) PCT Pub. No.: WO2011/160190
PCT Pub. Date: Dec. 29, 2011

(65) Prior Publication Data
US 2013/0094620 A1 Apr. 18, 2013

(30) Foreign Application Priority Data

Jun. 24, 2010 (AU) .............................. 2010902792

(51) Int. Cl.
*H04B 1/10* (2006.01)
*H04J 11/00* (2006.01)
(Continued)

(52) U.S. Cl.
CPC .......... *H04B 1/1081* (2013.01); *H04J 11/0063* (2013.01); *H04L 25/022* (2013.01);
(Continued)

(58) Field of Classification Search
CPC ...... H04B 1/1081; H04B 1/10; H04B 1/7093; H04B 1/707; H04B 1/709; H04L 27/2649; H04L 25/022; H04L 27/2695; H04L 27/06; H04L 27/26; H04L 7/042; H04L 27/2662; H04J 11/0063
USPC .......................... 375/350, 346, 343, 316, 219
See application file for complete search history.

(56) References Cited

U.S. PATENT DOCUMENTS

2007/0211806 A1 9/2007 Mudulodu
2008/0175328 A1* 7/2008 Lin et al. ....................... 375/260
(Continued)

FOREIGN PATENT DOCUMENTS

JP 2008-10987 A 1/2008
WO WO-2006/094037 A2 9/2006
(Continued)

OTHER PUBLICATIONS

"Australian Application Serial No. 2011269663, Examination Report mailed Mar. 17, 2014", 4 pgs.
(Continued)

*Primary Examiner* — Zewdu Kassa
(74) *Attorney, Agent, or Firm* — Schwegman Lundberg & Woessner, P.A.

(57) ABSTRACT

Described herein is a method and system for estimating a time-varying multipath communication channel. The system comprises a receiver for receiving a signal comprising a data packet transmitted over the multipath communication channel. The system also comprises a frequency-domain channel estimator that generates a frequency-domain channel estimate based on the received signal. The system further comprises a time-domain channel modeller that receives the frequency-domain channel estimate and generates an estimate of parameters in a time-domain model of the multipath communication channel. The model characterizes the multipath communication channel as a delay line with a plurality of taps, each tap having tap parameters defining a delay, a Doppler and a gain for the tap. The tap parameters are constant over the data packet.

27 Claims, 7 Drawing Sheets

(51) Int. Cl.
 H04L 25/02 (2006.01)
 H04L 27/26 (2006.01)
 H04L 27/06 (2006.01)

(52) U.S. Cl.
 CPC ........ H04L25/0204 (2013.01); H04L 25/0242 (2013.01); H04L 27/06 (2013.01); H04L 27/2649 (2013.01); H04L 27/2657 (2013.01); H04L 27/2671 (2013.01); H04L 27/2695 (2013.01)

(56) References Cited

U.S. PATENT DOCUMENTS

| | | | |
|---|---|---|---|
| 2010/0074317 A1 | 3/2010 | Sun et al. | |
| 2011/0158361 A1* | 6/2011 | Dent et al. | 375/347 |
| 2012/0287803 A1* | 11/2012 | Niu et al. | 370/252 |

FOREIGN PATENT DOCUMENTS

| | | |
|---|---|---|
| WO | WO-2007/022564 A1 | 3/2007 |
| WO | WO-2007/095697 A1 | 8/2007 |
| WO | WO-2008/040088 A1 | 4/2008 |
| WO | WO-2008/052192 A1 | 5/2008 |
| WO | WO-2010/144973 A1 | 12/2010 |

OTHER PUBLICATIONS

"International Application No. PCT/AU2011/000782, International Preliminary Report on Patentability dated Dec. 28, 2012", 7 pgs.

"International Application No. PCT/AU2011/000782, International Search Report and Written Opinion mailed Sep. 26, 2011", (Sep. 26, 2011), 11 pgs.

Barbarossa, Sergio, "Product High-Order Ambiguity Function for Multicomponent Polynomial-Phase Signal Modeling", vol. 46, No. 3, IEEE Transactions on Signal Processing, Mar. 1998, 18 pgs.

Hijazi, Hussein, at al., "OFDM High Speed Channel Complex Gains Estimation Using Kalman Filter and QR-Detector", Published in IEEE International Symposium on Wireless Communication Systems 2008 (ISWCS '08), Oct. 21-24, 2008, Reykjavik, Iceland (2008), (Oct. 24, 2008), 5 pgs.

"Japanese Application Serial No. 2013-515639, Office Action mailed Feb. 10, 2015", (w/ English Translation), 58 pgs.

Fukusada, Keigo, et al., "A Study on Maximum Doppler Frequency Estimation for OFDM Systems",(w/ English Abstract), IEICE Technical Report, 108(334), (208), 85-89.

Kayama, Hidenori, et al., "A study on the accurate channel estimation method applying sinc function based channel replica for a broadband OFDM wireless communication system", (w/ English Abstract), IEICE Technical Report, 107(192), (2007), 99-104.

Letzepis, Nick, et al., "Joint Estimation of Multipath Parameters from OFDM Signals in Mobile Channels", 2011 Australian Communications Theory Workshop (AusCTW). (2011), 106-111.

Wong, Ian C., et al., "Joint channel estimation and prediction for OFDM systems", IEEE Global Telecommunications Conference, GLOBECOM '05 vol. 4, (2005), 2255-2259.

\* cited by examiner

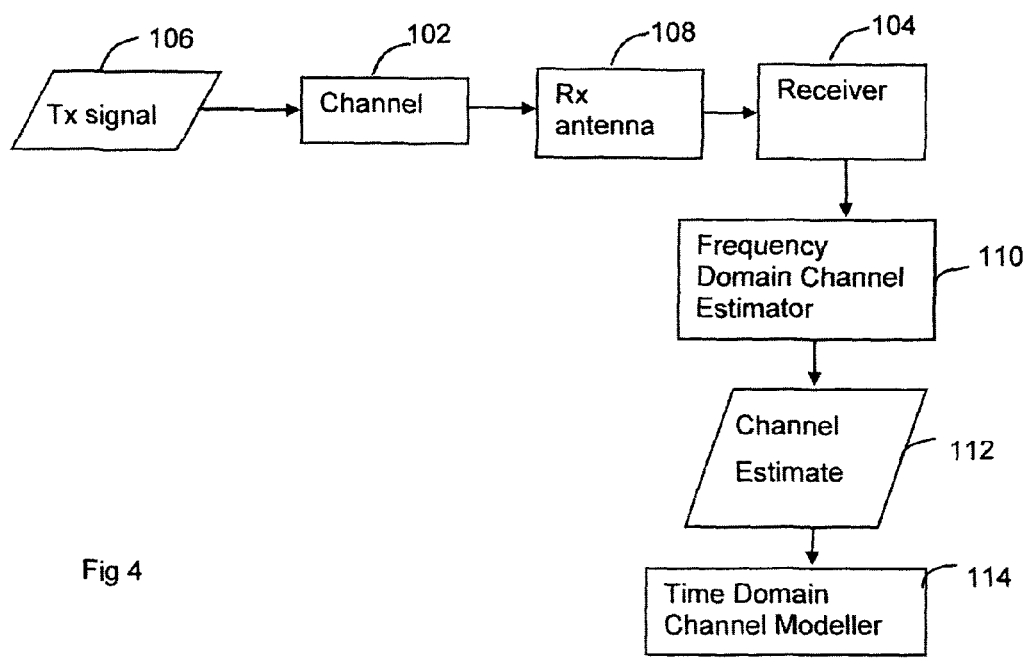
Fig 4
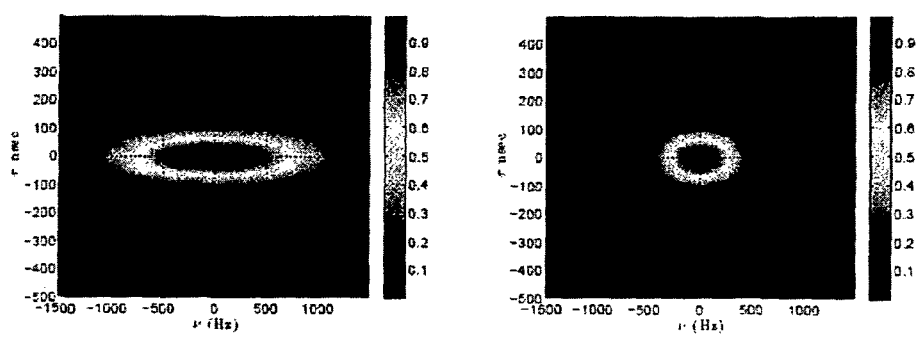
(a) $K = 52, L = 90$  (b) $K = 52, L = 242$
Fig 5A                    Fig 5B

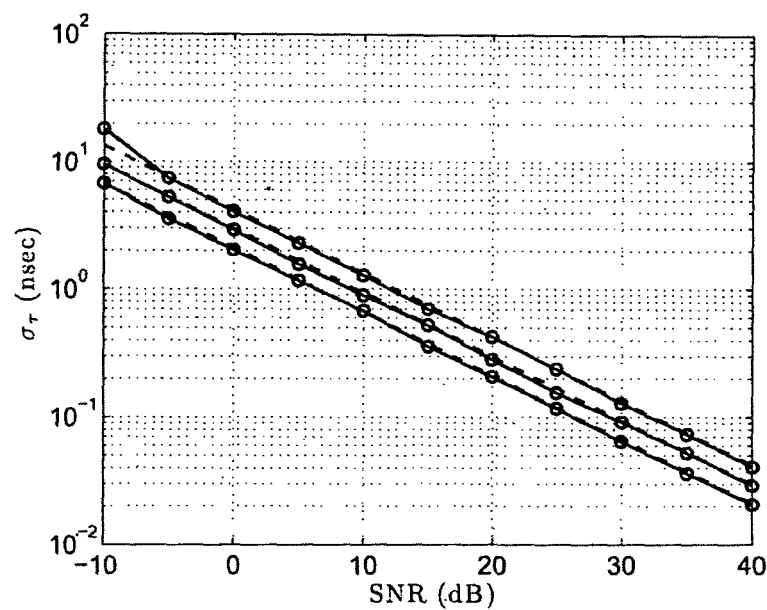
(a) RMS delay error
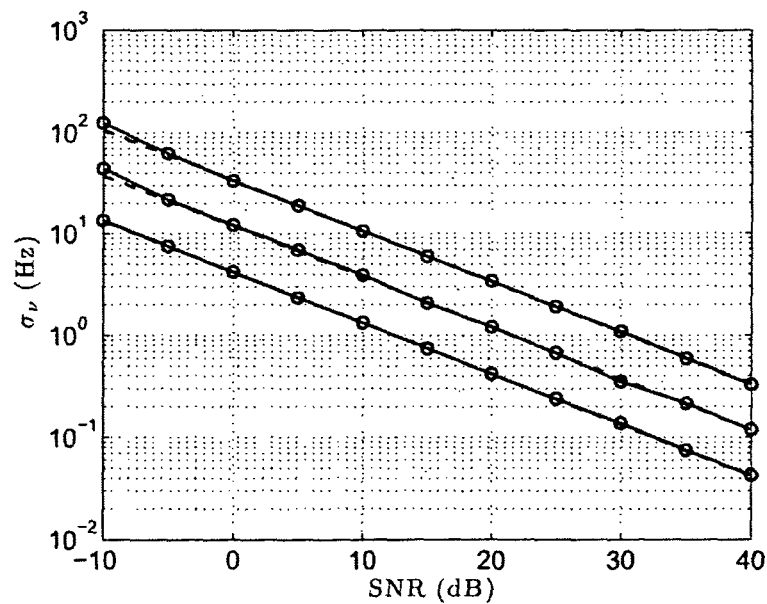
Fig 7

ESTIMATION OF A MULTIPATH SIGNAL IN A WIRELESS COMMUNICATION SYSTEM

PRIORITY CLAIM TO RELATED APPLICATIONS

This application is a national stage application under 35 U.S.C. §371 of PCT/AU2011/000782, filed Jun. 24, 2011, and published as WO 2011/160190 A1 on Dec. 29, 2011, which claims priority to Australian Application No. 2010902792, filed Jun. 24, 2010, which applications and publication are incorporated by reference as if reproduced herein and made a part hereof in their entirety, and the benefit of priority of each of which is claimed herein.

FIELD OF THE INVENTION

The present invention relates to the field of wireless communications. In particular the present invention relates to joint delay and Doppler frequency estimation from a received signal after the signal has been transmitted through a multipath channel.

BACKGROUND OF THE INVENTION

Wireless communication systems may be represented in terms of a transmitter 100 and receiver 104, separated by a channel 102, as shown in FIG. 1. The transmitter transforms the data into a signal suitable for transmission over the channel. For the purposes of determining the transmitted data, the goal of the receiver 104 is to remove the effects of the channel distortions from the signal and to obtain an estimate of the data.

The channel 102 represents the effects induced by the environment surrounding the wireless communications system. The channel 102 may distort the transmitted signal in some way. Channel distortions may include amplitude distortions, frequency offsets, phase offsets, Doppler effects, distortions resulting from multipath channels, additive noise or interference.

The receiver 104 may include a channel estimator. The channel estimator may observe a received signal that has been distorted by transmission over the channel 102, and generate a channel estimate based upon this observation.

Reference to any prior art in the specification is not, and should not be taken as, an acknowledgement or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to a first aspect of the present invention there is provided a method of estimating a time-varying multipath communication channel, the method comprising:
  receiving a signal comprising a data packet transmitted over the multipath communication channel; and, from the received signal
  generating an estimate of parameters in a model of the multipath communication channel, the model characterising the multipath communication channel as a delay line with a plurality of taps, each tap having tap parameters for estimation defining a delay, a Doppler and a complex gain for the tap,
  wherein the estimated tap parameters are constant for the data packet.

The data packet may be an orthogonal frequency division multiplex (OFDM) packet.

According to another aspect of the present invention there is provided a method of estimating a time-varying multipath communication channel, the method comprising:
  receiving a frequency-domain estimate of the multipath communication channel, the frequency-domain estimate deriving from a data packet transmitted over the multipath communication channel; and, based on the frequency-domain estimate
  generating an estimate of parameters in a time-domain model of the multipath communication channel, the time-domain model characterising the multipath communication channel as a delay line with a plurality of taps, each tap having tap parameters defining a delay, a Doppler and a complex gain for the tap,
  wherein the estimated tap parameters are constant for the data packet.

The method of generating estimates of the model parameters may comprise:
  defining a search window for the delay and Doppler tap parameters;
  dividing the search window into a plurality of bins;
  determining a correlator metric for the respective bins; and
  identifying one or more peaks in the determined correlator metrics; and
  outputting estimates of the delay and Doppler tap parameters based on the identified peaks.

The method of generating estimates of the model parameters may comprise;
  receiving a channel estimate;
  estimating a delay and Doppler tap parameter for a detected multipath component;
  performing a least-squares estimation to generate an estimate of a complex gain tap parameter for the detected tap; and
  subtracting the detected multipath component from the channel estimate, using the estimated delay, Doppler and complex gain tap parameters to quantify the detected multipath component.

The method may be repeated to iteratively remove detected multipath components from the channel estimate.

The method of generating estimates of the model parameters may comprise a method of refining estimates, comprising:
  receiving an initial channel estimate;
  receiving a set of estimated tap parameters for a plurality of multipath components;
  subtracting all of the plurality of multipath components from the initial channel estimate except for a currently-considered multipath component;
  generating a refined estimate of the delay tap parameter and the Doppler tap parameter for the currently-considered multipath component;
  performing a least-squares estimation to generate a refined estimate of the complex gain tap parameter for the currently-considered multipath component.

The method of refining estimates may be repeated to generate refined estimates for a plurality of multipath components.

Also disclosed is an apparatus to perform the methods described in the preceding paragraphs.

The invention also resides in instructions executable by an apparatus to implement the described methods and in such instructions when stored in a storage medium readable by the apparatus.

According to a further aspect of the present invention there is provided a system for estimating a time-varying multipath communication channel, the system comprising:

a receiver for receiving a signal comprising a data packet transmitted over the multipath communication channel;

a frequency-domain channel estimator that generates a frequency-domain channel estimate based on the received signal; and a time-domain channel modeller that receives the frequency-domain channel estimate and generates an estimate of parameters in a time-domain model of the multipath communication channel, the model characterising the multipath communication channel as a delay line with a plurality of taps, each tap having tap parameters defining a delay, a Doppler and a complex gain for the tap, wherein the tap parameters are constant over the data packet.

BRIEF DESCRIPTION OF THE DRAWINGS

Embodiments of the present invention will now be described with reference to the drawings, in which:

FIG. 4 is a schematic representation of an embodiment of a system for processing a received signal and estimating a channel model;

FIG. 5A is a magnitude contour plot of an ambiguity function of an OFDM system with PSK modulation and a signal having 90 symbols;

FIG. 5B is a magnitude contour plot of an ambiguity function of an OFDM system with PSK modulation and a signal having 242 symbols;

FIG. 7 shows a performance evaluation of the methods of FIG. 6 using Monte Carlo simulations with a single tap.

DETAILED DESCRIPTION OF THE EMBODIMENTS

Embodiments of an estimator are described for the estimation of multipath components when a signal is transmitted in a mobile environment. The estimator may be used for doubly dispersive channels, where the frequency selectivity of the channel changes with time.

The described techniques have potential application to wireless communications systems, e.g. DVB-T, DVB-H, IEEE 802.11, IEEE 802.16, 3GPP2, Dedicated Short Range Communications (DSRC), Communications Access for Land Mobiles (CALM), and proprietary systems.

An electromagnetic signal transmitted in a mobile environment is scattered by objects in the environment. The receiver 104, which may also possess a certain velocity relative to the transmitter 100, receives the superimposition of delayed and frequency-shifted versions of the transmitted signal caused by reflections from the objects. Each of these versions of the transmitted signal is referred to as a multipath component, a multipath tap, a channel tap, and/or a tap and is represented by P in the equations herein. This type of channel 102 is commonly referred to as a multipath channel. The delay, also referred to as time of arrival (ToA), of each multipath component is caused by the time it takes for the signal to travel the path distance and is represented by $\tau$. The frequency offset, also referred to as Doppler frequency and/or Doppler, is caused by the Doppler effect and is represented by $\nu$.

The estimation of the delay and/or Doppler of each multipath component may be output to a user interface such as a graphical display and/or stored in memory for use in radar applications for target detection and localisation or for channel characterisation in signal communication. The estimation may be provided to a radar application for target detection and localisation, for example in a digital form for use by radar application software. The estimation may be provided to a signal communication application for channel characterisation. The estimation may be used in a signal communication application for the development of efficient and reliable communication schemes.

If the coherence bandwidth of the multipath is small compared with the bandwidth of the transmitted signal, the resulting channel is frequency selective. Orthogonal frequency division multiplexing (OFDM) is a transmission strategy specifically designed to combat frequency-selective channels with relatively low receiver complexity. In OFDM, the signal bandwidth is divided into several non-overlapping (hence orthogonal) narrowband subcarriers, such that each subchannel is frequency non-selective.

Figure 1:
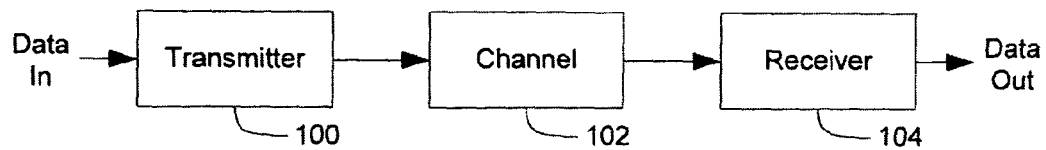
FIG. 1 is a schematic drawing of a communications system.
Figure 2:
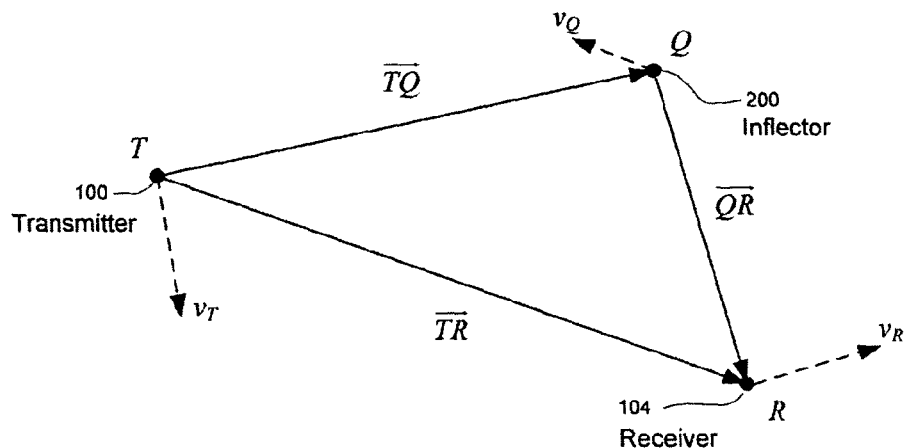
FIG. 2 illustrates an example of an environment with a two-path channel.

FIG. 2 shows an example of an environment with an inflector 200 inducing a two path channel between the transmitter 100 and receiver 104, where:

T is a point representing the position of the transmitter 100;

R is a point representing the position of the receiver 104; and

Q is a point representing the position of the signal inflector 200.

Figure 3:
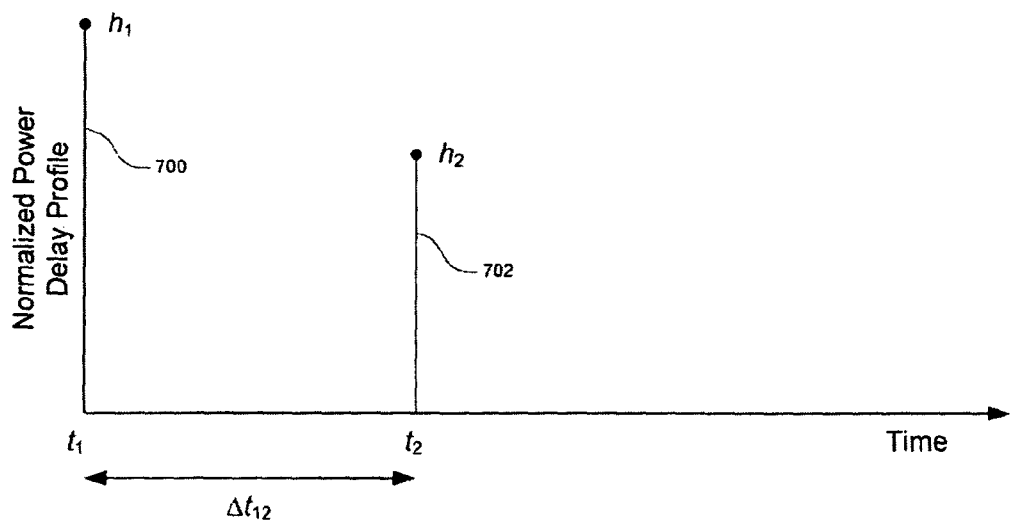
FIG. 3 is an example of a time domain channel having two paths corresponding to the environment of FIG. 2.

FIG. 3 shows an example of a channel 102 in the time domain (with normalised power delay profile) corresponding to the environment of FIG. 2. The direct path TR corresponds to channel tap $h_1$ 700 at time $t_1$. The inflected path via inflector 200 corresponds to channel tap $h_2$ 702 at delay $t_2$. In this example $h_2$ 702 has lower power relative to tap $h_1$ 700 due to increased propagation loss (as the inflected path is longer than the direct path) and attenuation at the point of inflection 200. The time difference between the two channel taps is $\Delta t_{12} = t_2 - t_1$. The instantaneous phase, and rate of change of phase, of taps $h_1$ 700 and $h_2$ 702 may also differ.

As seen in FIG. 4, a transmitted signal 106 is subjected to the channel 102 induced by the environment. The received signal is collected at the receive antenna 108, and input to the receiver 104. The receiver 104 processes the received signal to determine the transmitted data. FIG. 4 shows receiver processing in the context of the channel estimation and may omit details pertaining to the common operation of a receiver 104 apparent to those skilled in the art. For example, the receiver 104 may also make the transmitted data available to other components of a communication system.

The receiver 104 outputs receiver information, for example received signal samples, to a frequency-domain channel estimator 110 that provides an initial channel estimate 112 in the frequency domain as the channel varies over the duration of a packet. Our previous commonly-assigned International (PCT) Applications, PCT/2006/AU001201, PCT/2007/AU000231 and PCT/2007/AU001506 published under WIPO publication numbers WO2007022564 WO2007095697, WO2008040088 (respectively), the contents of which are incorporated herein by reference, disclose systems and methods for the channel estimator 110.

The frequency domain channel estimator 110 is shown as a separate functional module to the receiver 104, but in practice the channel estimator 110 may be a component of the receiver 104.

The frequency-domain channel estimate 112 is provided to a time-domain channel modeller 114 that estimates time domain parameters including the delay, complex gain and Doppler for each multipath tap. The methods used in the time-domain channel modeller are described in more detail below.

The time-domain channel modeller 114 may be a functional module incorporated in the receiver 104. Alternatively, the modeller 114 may be implemented as a separate unit in data communication with the receiver 104. The modeller 114 may also be run off-line, that is, using data that was received earlier by receiver 104.

The functional modules described herein, including the frequency-domain channel estimator 110 and the time-domain channel modeller 114, may be implemented in hardware, for example application-specific integrated circuits (ASICs). Other hardware implementations include, but are not limited to, field-programmable gate arrays (FPGAs), structured ASICs, digital signal processors and discrete logic. Alternatively, the functional modules may be implemented as software, such as one or more application programs executable within a computer system. The software may be stored in a computer-readable medium and be loaded into a computer system from the computer readable medium for execution by the computer system. A computer readable medium having a computer program recorded on it is a computer program product. Examples of such media include, but are not limited to CD-ROMs, hard disk drives, a ROM or integrated circuit. Program code may also be transmitted via computer-readable transmission media, for example a radio transmission channel or a networked connection to another computer or networked device.

The methods used in the modeller 114 use the system model described in the following section.

1. System Model

Consider a K subcarrier OFDM system, where packets of length L OFDM symbols are transmitted. Let $X_{l,k} \in \chi$ denote the symbol of subcarrier k of OFDM symbol l, where $\chi \subset \mathbb{C}$ is an arbitrary complex constellation. Each symbol is drawn at random, independently and uniformly from $\chi$ and has unit average energy, i.e. $\mathbb{E}[|X_{l,k}|^2]=1$ and $\mathbb{E}[X_{l,k}X^*_{n,m}]=0$ for any $n \neq l$ or $m \neq k$. The receiver is assumed to have complete knowledge of the transmitted symbols $X_{l,k}$, e.g. a pilot signal, or from the feedback of decoder decisions.

We let $\chi(t)=\Sigma_{l=0}^{L-1} \chi_l(t)$ denote the continuous-time transmitted OFDM signal, where $$x_l(t) = \frac{1}{\sqrt{KL}} \sum_{k=-\lfloor K/2 \rfloor}^{\lceil K/2 \rceil - 1} X_{l,k} e^{j2\pi k(t-T_{cp})/T} w(t - lT_d), \quad (1)$$

is the lth OFDM symbol, $T_d$ is the OFDM symbol duration (seconds). 1/T is the subcarrier spacing (Hz). $T_{cp}=T_d-T_{cp}$ is the cyclic prefix duration (seconds), and w(t) is a windowing function such that $$w(t) = \begin{cases} \tilde{w}(t) & 0 \leq t \leq T_d \\ 0 & \text{otherwise,} \end{cases} \quad (2)$$

and $\int_0^{T_d} |w(t)|^2 dt = 1$. Hence the transmitted signal has unit energy, i.e. $\mathbb{E}[\int_{-\infty}^{\infty} |\chi(t)|^2 dt]=1$. The most simplest windowing function is when $\tilde{w}(t)=1/\sqrt{T_d}$. Note that the requirement that w(t)=0 for $t \notin (0, T_d)$ is not necessarily required, but we assume this for simplicity. In practice, (1) is implemented via the inverse discrete Fourier transform (IDFT).

We assume transmit and receive filter responses $g_{Tx}(t)$ and $g_{Rx}(t)$ respectively, and a doubly dispersive channel model with P multipath components, $$c(t, \tau) = \sum_{p=1}^{P} a_p e^{-j2\pi v_p t} \delta(\tau - \tau_p). \quad (3)$$

where $\alpha_p$, $v_p$ and $\tau_p$ denote the pth complex gain, Doppler and delay respectively. Note that these parameters are assumed to be constant over the L symbols of the OFDM packet. Hence, we write the overall channel response as $$h(t, \tau) = (g * c)(t, \tau) = \sum_{p=1}^{P-1} a_p e^{-j2\pi v_p t} g(\tau - \tau_p), \quad (4)$$

where $g(t)=(g_{Tx}*g_{Rx})$ is the combined transmit/receive filter response and * denotes the convolution.

An ambiguity function for the transmitted signal x(t) is defined as:

$$A_\chi(\tau,v) = \int_{-\infty}^{\infty} \chi(t)\chi^*(t-\tau)e^{-j2\pi vt} dt. \quad (5)$$

For the OFDM signal defined in (1), the ambiguity function can be written as follows.

$$A_x(\tau, v) = \frac{1}{KL} \sum_{l,k,l',k'} X_{l,k} X^*_{l',k'} e^{-j2\pi(k-k')T_{cp}/T} \quad (6)$$
$$e^{j2\pi k'\tau/T} e^{-j2\pi vT_d l} A_w(\tau + (l' - l)T_d, v + (k' - k)/T).$$

where $$A_w(\tau, v) = \int_{-\infty}^{\infty} w(t)w^*(t-\tau)e^{-j2\pi vt} dt \quad (7)$$

is the ambiguity function of w(t). In practice, w(t) is usually designed such that $A_w(\tau,v) \approx 0$ for $|\tau|>T_{cp}$ and $|v|>1/T$, which implies $$A_x(\tau, v) = \frac{A_w(\tau, v)}{KL} \sum_{k,l} |X_{l,k}|^2 e^{j2\pi k\tau/T} e^{-j2\pi vT_d l}. \tag{8}$$

For example, for the special case of $\hat{w}(t)=1/\sqrt{T_d}$, then we have $$A_w(\tau, v) = \begin{cases} \left(1 - \frac{\tau}{T_d}\right) e^{-j\pi v(T_d+\tau)} \mathrm{sinc}(\pi v(T_d - \tau)) & 0 \leq \tau < T_d \\ \left(1 + \frac{\tau}{T_d}\right) e^{-j\pi v(T_d+\tau)} \mathrm{sinc}(\pi v(T_d + \tau)) & -T_d \leq \tau \leq 0 \\ 0 & \text{otherwise.} \end{cases} \tag{9}$$

In practice OFDM systems are designed such that the cyclic prefix is greater than the delay spread of the channel. i.e. we are primarily concerned with $0<\tau<<T_d$. In addition, Doppler frequencies induced by the mobile channel are typically $|v|<<1/T$. Under these conditions. $A_w(\tau,v)\approx 1$ and the ambiguity function is approximately $$A_x(\tau, v) \approx \frac{1}{KL} \sum_{k,l} |X_{l,k}|^2 e^{j2\pi k\tau/T} e^{-j2\pi vT_d l}. \tag{10}$$

For the special case when $|X_{l,k}|=1$, i.e. PSK modulation, then the ambiguity function further simplifies to $$A_x(\tau, v) \approx \frac{1}{KL} e^{-j2\pi[K/2]\tau/T} e^{-j\pi(L-1)vT_d} \frac{\sin(\pi\tau K/T)}{\sin(\pi\tau/T)} \frac{\sin(\pi vT_d L)}{\sin(\pi vT_d)}. \tag{11}$$

From this expression it is apparent that the sin/sin terms will introduce sidelobes, which are de-coupled in time and frequency. As an example, the ambiguity function of the IEEE 802.11 standard is plotted in FIG. 5A, showing a 64 subcarrier system with 52 active subcarriers and zero DC subcarrier, $T_d$=8 µsec and T=6.4 µsec. In this example, K=52 and the summation terms in (10) range from k=−26, . . . −1 to k=1, . . . , 26. For OFDM systems where there is no DC subcarrier, (11) becomes, $$A_x(\tau, v) \approx \tag{12}$$
$$\frac{2e^{-j\pi(L-1)vT_d}}{KL} \cos[\pi(K/2+1)(\tau/T)] \frac{\sin(\pi\tau K/(2T))}{\sin(\pi\tau/T)} \frac{\sin(\pi vT_d L)}{\sin(\pi vT_d)}.$$

The vertical axis represents delay and the horizontal axis represents Doppler. FIG. 5B shows the ambiguity function when the number of symbols, L, is increased to 242. It may be seen that increasing L improves the Doppler resolution but not the delay resolution, which is dependent only on K and the subcarrier spacing (1/T).

In practice the OFDM signal of (1) is filtered and upconverted in transmitter 100, transmitted through multipath channel 102, down-converted and receive filtered in receiver 104. Assuming the up/down conversion process is done perfectly, the received continuous-time baseband signal may be written as:

$$y(t) = \sum_{l'} x_{l'}(t) * h(t, \tau) + \delta(t) * g(t) \tag{13}$$

$$= \sum_{l'} \int_{-\infty}^{\infty} x_{l'}(t-\tau)h(t, \tau)d\tau + z(t)$$

$$= \frac{1}{\sqrt{KLT_d}} \sum_{l',k'} X_{l',k'} \int_{-\infty}^{\infty} e^{j\pi k'(t-\tau-T_{cp})/T}$$

$$w(t-\tau-l'T_d)h(t, \tau)d\tau + z(t)$$

$$= \frac{1}{\sqrt{KLT_d}} \sum_{l',k',p} a_p X_{l',k'} \int_{-\infty}^{\infty} e^{j\pi k'(t-\tau-T_{cp})/T}$$

$$w(t-\tau-l'T_d) e^{-j2\pi v_p t} g(\tau-\tau_p)d\tau + z(t)$$

$$= \frac{1}{\sqrt{KLT_d}} \sum_{l',k',p} a_p X_{l',k'} \Phi_{l',k'}(t, \tau_p)$$

$$e^{j2\pi k'(t-T_{cp})/T} e^{-j2\pi v_p t} + z(t)$$

where $\tilde{z}(t)$ is an AWGN process and $$\Phi_{l,k}(t,\tau_p) = \int_{-\infty}^{\infty} g(\tau-\tau_p)w(t-\tau-lT_d)e^{-j2\pi k\tau/T}d\tau \tag{14}$$

To simplify (14) let $$G(f) = \mathcal{F}\{g(t)\} \triangleq \int_{-\infty}^{\infty} g(t)e^{-j2\pi ft}dt \tag{15}$$

$$W(f) = \mathcal{F}\{w(t)\} \triangleq \int_{-\infty}^{\infty} w(t)e^{-j2\pi ft}dt \tag{16}$$

The Fourier transform of convolution in (14) is the same as the multiplication of the constituent Fourier transform. i.e.

$$\mathcal{F}\{\Phi_{l,k}(t, \tau_p)\} = \mathcal{F}\{g(t-\tau_p)e^{-j2\pi kt/T}\}\mathcal{F}\{w(t-lT_d)\} \tag{17}$$

$$= e^{-j2\pi \tau_p(f+k/T)} e^{-j2\pi lT_d f} G(f+k/T)W(f).$$

In practical systems, G(f) has a bandwidth that exceeds the bandwidth of the signal, i.e. K/T. In addition W(f) has a bandwidth of approximately $1/T_d$. Assuming ideal filtering, then $G(f+k/T)=1$, $-F_s/2-k/T<f<F_s/2-k/T$ and zero otherwise. e.g. $g(t)=\mathrm{sinc}(\pi tF_s)$, where $F_s>K/T$ is the bandwidth of the filter. Hence we may write $$\mathcal{F}\{\Phi_{l,k}(t,\tau_p)\} \approx e^{-j2\pi \tau_p(f+k/T)} e^{-j2\pi lT_d f} W(f). \tag{18}$$

and therefore $$\Phi_{l,k}(t,\tau_p) \approx e^{-j2\pi k\tau_p/T} w(t-\tau_p-lT_d). \tag{19}$$

The received signal can now be written as $$y(t) = \frac{1}{\sqrt{KL}} \sum_{l',k',p} a_p X_{p,k'} e^{j2\pi k'(t-T_{cp})/T} \tag{20}$$

$$e^{-j2\pi v_p t} e^{-j2\pi k'\tau_p/T} w(t-\tau_p-l'T_d) + z(t)$$

The receiver performs the matched filter to the transmitted sinusoids (less the cyclic prefix), $$Y_{l,k} = \frac{1}{\sqrt{KL}} \int_{T_{cp}+lT_d}^{(l+1)T_d} y(t)w^*(t-lT_d)e^{-j2\pi k(t-T_{cp})/T} dt = \quad (21)$$

$$\frac{1}{KL} \sum_{l',k',p} a_p X_{l',k'} \int_{T_{cp}+lT_d}^{(l+1)T_d} e^{j2\pi k'(t-T_{cp})/T} e^{-j2\pi \nu_p t} e^{-j2\pi k' \tau_p/T} \times$$

$$w(t-\tau_p - l'T_d)w^*(t-lT_d)e^{-j2\pi k(t-T_{cp})/T} dt + Z_{l,k} =$$

$$\frac{1}{KL} \sum_{k',p} a_p X_{l,k'} \int_{T_{cp}+lT_d}^{(l+1)T_d} e^{j2\pi k'(t-T_{cp})/T} e^{-j2\pi \nu_p t} e^{-j2\pi k' \tau_p/T} \times$$

$$w(t-\tau_p - lT_d)w^*(t-lT_d)e^{-j2\pi k(t-T_{cp})/T} dt + Z_{l,k} =$$

$$\frac{1}{KL} \sum_{k',p} a_p X_{l,k'} e^{-j2\pi k' \tau_p/T} \times \int_{T_{cp}+lT_d}^{(l+1)T_d} w(t-\tau_p - lT_d)$$

$$w^*(t-lT_d)e^{j2\pi(k'-k)(t-T_{cp})/T} e^{-j2\pi \nu_p t} dt + Z_{l,k} =$$

$$\frac{1}{KL} \sum_{k',p} a_p X_{l,k'} e^{-j2\pi k' \tau_p/T} \times \int_{T_{cp}}^{T_d} w(t-\tau_p)w^*(t)$$

$$e^{j2\pi(k'-k)(t+lT_d-T_{cp})/T} e^{-j2\pi \nu_p(t+lT_d)} dt + Z_{l,k} =$$

$$\frac{1}{KL} \sum_{k',p} a_p X_{l,k'} e^{-j2\pi k' \tau_p/T} e^{j2\pi(k'-k)(lT_d-T_{cp})/T} e^{-j2\pi \nu_p T_d l} \times$$

$$\int_{T_{cp}}^{T_d} w(t-\tau_p)w^*(t)e^{j2\pi(k'-k)t/T} e^{-j2\pi \nu_p t} dt + Z_{l,k} =$$

$$\frac{1}{KL} \sum_{k',p} X_{l,k'} a_p e^{-j2\pi k' \tau_p/T} e^{j2\pi(k'-k)(lT_d-T_{cp})/T}$$

$$e^{-j2\pi \nu_p T_d l} \hat{A}_w(\tau_p, \nu_p + (k-k')/T) + Z_{l,k},$$

where $$\hat{A}_w(\tau, \nu) = \int_{T_{cp}}^{T_d} w(t-\tau)w^*(t)e^{-j2\pi \nu t} dt, \quad (22)$$

which resembles the ambiguity function of w(t). The second line of (21) follows since the integral is approximately zero for any l' not equal to l. Typically, w(t) has a bandwidth of $1/T_d$, and hence $\hat{A}_w(\tau_p, \nu_p+(k-k')/T) \approx 0$ for k'≠k. Therefore, $$Y_{l,k} = \frac{1}{KL} \sum_p a_p X_{l,k} e^{-j2\pi k \tau_p/T} e^{-j2\pi \nu_p T_d l} \hat{A}_w(\tau_p, \nu_p) + Z_{l,k}. \quad (23)$$

For the special case of $\hat{w}(t)=1/\sqrt{T_d}$, i.e. a rectangular window function, then $$\hat{A}_w(\tau, \nu) = \frac{T}{T_d} e^{-j\pi \nu(T_d+T_{cp})} \text{sinc}(\pi \nu T) \quad 0 < \tau < T_{cp} \quad (24)$$

In practice, $0<\max_p \tau_p<T_{cp}$ and $\max_p \nu_p<<1/T$. Therefore $$\hat{A}_w(\tau_p, \nu_p) \approx \frac{T}{T_d} e^{-j\pi \nu(T_d+T_{cp})}$$

and hence (23) simplifies to $$Y_{l,k} = X_{l,k} \sum_{p=1}^{P} \tilde{a}_p e^{-j2\pi \nu_p T_d l} e^{-j2\pi k \tau_p/T} + Z_{l,k}, \quad (25)$$

where $\tilde{a}_p = \frac{1}{KL} \frac{T}{T_d} e^{-j\pi \nu_p(T_d+T_{cp})} a_p$.

2. Joint Delay/Doppler Estimation

It is assumed that the receiver 104 has perfect knowledge of the transmitted symbols $X_{l,k}$. This may, for example, result from the use of pilot symbols or the feedback of correct decoder decisions in the receiver. As a result, we may assume the modeller 114 has perfect knowledge of the channel gains $H_{l,k}$:

$$Y_{l,k}=H_{l,k}X_{l,k}+Z_{l,k}, \quad (26)$$

where from (25), $$H_{l,k} = \sum_{p=1}^{P} \tilde{a}_p e^{-j2\pi \nu_p T_d l} e^{-j2\pi k \tau_p/T} \quad (27)$$

Hence the problem is to estimate P, $\alpha_p$, $\tau_p$ and $\nu_p$ for p=1, . . . P from $H_{l,k}$, or its noisy estimate.

Equation (27) is simply the superimposition of 2-dimensional exponential signals.

Two estimation algorithms are described below: the first is based on a conventional correlator approach; the second is based on a matching pursuit or basis pursuit algorithm which takes advantage of the sparse nature of the channel taps.

2.1. Method 600—Correlator Approach

Figure 6A:
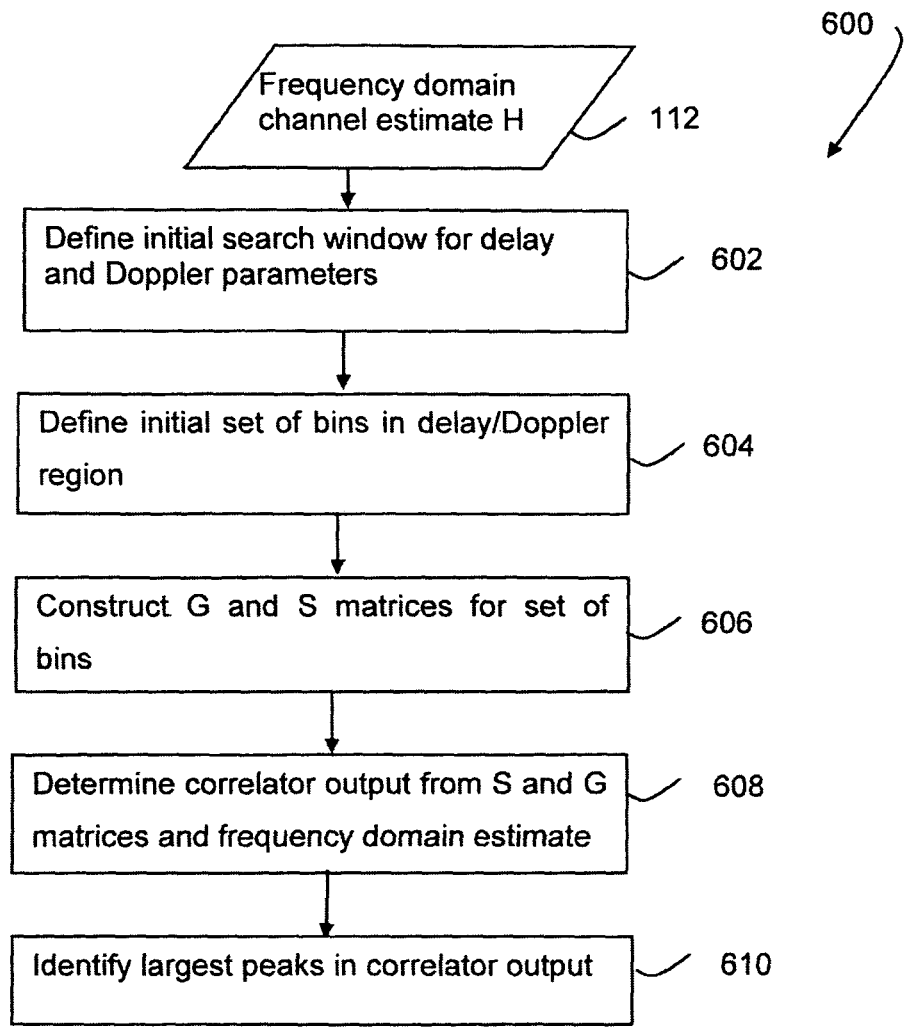
FIG. 6A is a flow diagram of a first method for joint delay/Doppler estimation.

A first method 600 for the time domain channel modeller is shown in FIG. 6A. Method 600 is based on a correlator approach and may for example be implemented as software instructions running on the modeller 114.

The input is the frequency domain channel estimate 112. In step 602 an initial delay search window and initial Doppler search window are defined. Then, in step 604 a grid-based approach is used to divide the (τ,ν) plane into bins. An iterative sequence follows. In step 606 G and S matrices (associated with the delay and Doppler effects respectively) are constructed as described in more detail below with reference to equations (30) to (32). In step 608 a correlator output metric is determined using equation (32). In step 610 the channel modeller identifies the P largest peaks in the correlator metric.

Let $\hat{H}$ be a noisy estimate obtained from Y given knowledge of X, i.e.

$$\hat{H}=H+\hat{Z}. \quad (28)$$

where $\hat{Z}$ is additive noise, not necessarily Gaussian, e.g. if $\hat{H}=Y \odot X$ is the zero-forcing estimate, then $\hat{Z}=Z \odot X^*$ is not necessarily Gaussian. The correlator approach computes the following metric, $$\psi(\tau,\nu)=s^t(\nu)\hat{H}g^t(\tau), \quad (29)$$

where s(ν) is a L×1 column vector, whose lth element is given by $s_l(\nu)=e^{-j2\pi \nu T_d l}$, l=0, . . . , L−1, and g(τ) is a 1×K column vector whose kth element is given by $g_k(\tau)=e^{-j2\pi k\tau/T}$.

To implement the correlator estimator we evaluate (29) over a region of the (τ, ν)-plane and take the P largest peaks. In particular, we use a grid based approach, i.e. we divide the region into discrete bins. Let M and N denote the number of delay and Doppler bins respectively. Let ($\tau_{min}$, $\tau_{max}$) and ($\nu_{min}$, $\nu_{max}$) denote the delay and Doppler region. Let $\tau_m$ and $\nu_n$ denote bin m, n of the delay-Doppler region, i.e.

$$\hat{\tau}_m = \tau_{min} + m\frac{\tau_{max} - \tau_{min}}{M} \quad (30)$$

$$\hat{v}_n = v_{min} + n\frac{v_{max} - v_{min}}{N}. \quad (31)$$

for m=0, ..., M−1 and n=0, ..., N−1. Let $\hat{S}$ and $\hat{G}$ denote the matrices constructed using the above bins, i.e. $\hat{S}_{l,n} = e^{-j2\pi v_n T_d}$ and $\hat{G}_{m,k} = e^{-j2\pi k t_m/T}$. The correlator output can be computed via the matrix multiplication, $$\psi = \hat{S}^t \hat{H} \hat{G}^t. \quad (32)$$

The estimator then picks the $\hat{P}$ largest peaks. Note that there is some similarity between (32) and the 2D DFT. Complexity reduction may be possible in computing (32) by taking advantage of the fast Fourier transform (FFT).

To investigate the correlator estimator from (27) we have, $$\varphi(\tau, v) = \sum_{p,k,l} a_p e^{-j2\pi(v_p - v)} e^{-j2\pi(\tau_p - \tau)} + s^\dagger(v)\hat{Z}g^\dagger(\tau) \quad (33)$$

$$= \sum_p a_p A_x(\tau - \tau_p, v_p - v) + s^\dagger(v)\hat{Z}g^\dagger(\tau),$$

i.e. the output correlator metric is the sum of complex scaled versions of the transmit signal ambiguity function. Hence we see that correlator estimator performance of method 600 is affected by sidelobes of the ambiguity function, which may cause false and miss detections. Although method 600 has relatively low complexity, it may suffer from missed and false channel detection due to the sidelobes in the ambiguity function. In particular, for strong line of sight (LOS) channels, the peaks corresponding to weaker channel taps may be hidden by the sidelobes of the LOS component.

2.2. Method 630—Estimation via successive multipath cancellation

From (27) we see that $H_{l,k}$ is the sum of a sparse number of points. This suggests that the use of sparse estimation techniques may be beneficial in terms of reducing complexity with relatively low loss in performance. One approach is method 630 shown in FIG. 6B. This uses an orthogonal matching pursuit (OMP) algorithm to provide an iterative algorithm that successively removes previously-estimated multipath components from the original channel estimates as they are detected. A basis pursuit algorithm can also be used in the iterative process of removing previously-estimated multipath components. Method 630 takes advantage of the simplified signal derivations given above in equations (1) to (25) and allows the detection of components that would otherwise be hidden by erroneous sidelobes.

Let $\hat{\tau}_p, \hat{v}_p$ be 1×p vectors of delay and Doppler estimates respectively.

Let $S(\hat{v}_p) = (s(\hat{v}_1) \ldots s(\hat{v}_p))$ and $G(\hat{\Sigma}_p) = (g^t(\hat{\tau}_1) \ldots g^t(\hat{\tau}_p))^t$ denote the corresponding matrices The estimation of the complex gain vector $\alpha_p$ involves finding the solution to $$\hat{a}_p = \operatorname*{argmin}_{a_p} \left\| \hat{H} - S(\hat{v}_p)\operatorname{diag}(a_p)G(\hat{\tau}_p) \right\|^2, \quad (34)$$

which can be shown to be $$\hat{\alpha}_p = R_p^{-1} w_p. \quad (35)$$

where $w_p$ is a p×1 column vector that is computed recursively using, $$w_p = \begin{pmatrix} w_{p-1} \\ \sum_{l=0}^{L-1} \sum_{k=0}^{K-1} \hat{H}_{l,k} g_k^*(\hat{\tau}_p) s_l^*(\hat{v}_p) \end{pmatrix} = \begin{pmatrix} w_{p-1} \\ s^\dagger(\hat{v}_p)\hat{H}g^\dagger(\hat{\tau}_p) \end{pmatrix}. \quad (36)$$

The p×p matrix $R_p$ is also computed recursively, i.e.

$$R_p = \begin{pmatrix} R_{p-1} & r^\dagger \\ r & KL \end{pmatrix}. \quad (37)$$

where r is a 1×p−1 row vector whose nth element, n=1, ..., p−1, is given by $$r_n = \sum_{l=0}^{L-1} \sum_{k=0}^{K-1} g_k^*(\hat{\tau}_p) g_k(\hat{\tau}_n) s_l^*(\hat{v}_p) s_l(\hat{v}_n) \quad (38)$$

$$= g(\hat{\tau}_n) g^\dagger(\hat{\tau}_p)(s^\dagger(\hat{v}_n)s(\hat{v}_p))^*$$

$$= e^{-j\pi(L-1)(\hat{v}_n - \hat{v}_p)T_d} e^{-j\pi(K-1)(\hat{\tau}_n - \hat{\tau}_p)/T} \quad (39)$$

$$\frac{\sin(\pi L(\hat{v}_n - \hat{v}_p)T_d)}{\sin(\pi(\hat{v}_n - \hat{v}_p)T_d)} \frac{\sin(\pi K(\hat{\tau}_n - \hat{\tau}_p)/T)}{\sin(\pi(\hat{\tau}_n - \hat{\tau}_p)/T)}.$$

A detailed description of method 630 is given in algorithm 1.

---

Algorithm 1 Estimation via successive multipath cancellation.

1:    $\Delta_0 = \hat{H}$
2:    p = 1
3:    while $\|\Delta_{p-1}\|^2 > a$ and $p \leq P_{max}$ do
4:      $(\hat{\tau}_p, \hat{v}_p) = \arg\max_{\tau,v} |s^\dagger(v)\Delta_{p-1}g^\dagger(\tau)|$
5:      if p > 1 then
6:        Compute $R_p$ and $w_p$ recursively using (37) and (36)
7:      else
8:        $R_1 = KL$
9:        $w_1 = s^\dagger(\hat{v}_1)\hat{H}g^\dagger(\hat{\tau}_1)$
10:      end if
11:      $\hat{a}_p = R_p^{-1} w_p$.
12:      $\Delta_p = \Delta_{p-1} - a_p s(\hat{v}_p)g(\hat{\tau}_p)$
13:      p = p + 1
14:    end while

---

Figure 6B:
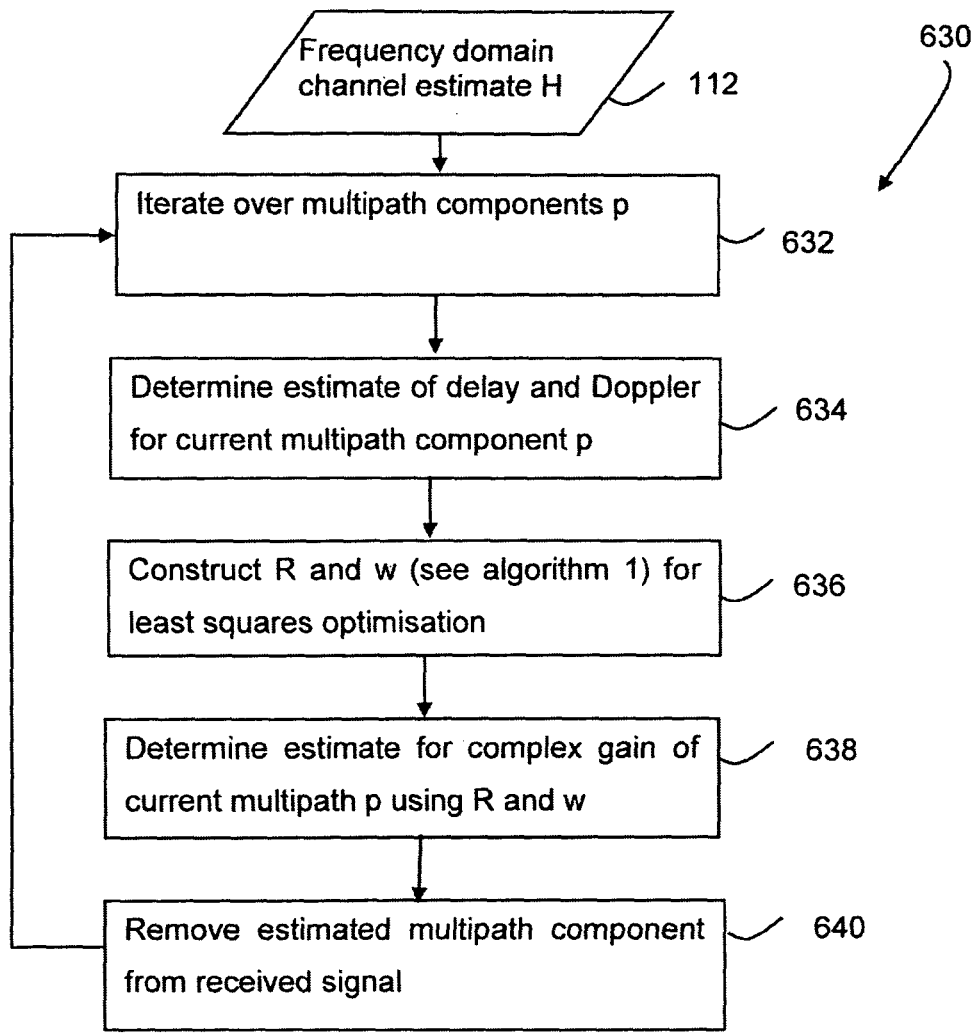
FIG. 6B is a flow diagram of an iterative method for joint delay/Doppler estimation via successive multipath cancellation.

As summarised in FIG. 6B, the input to method 630 is a channel estimate H. Method 630, commencing in step 632, performs an iteration over detected multipath components p, up to a maximum value of $P_{max}$.

For the current multipath component, a correlation metric is calculated to provide an estimate of the delay and Doppler in step 634 (see point 4, of algorithm 1). This may be determined using the 2-dimensional bisection approach described below in algorithm 3.

Then, in step 636 the time-domain channel modeller 114 constructs an R matrix and w vector for a least squares optimisation on the current multipath component p (see points 5. to 9. of algorithm 1). In step 638 the modeller 114 determines the estimate for the complex gain of the current multipath component p using the constructed R and w. In step 640 the detected multipath component is removed from the residual signal.

3. Iterative Refinement

Figure 6C:
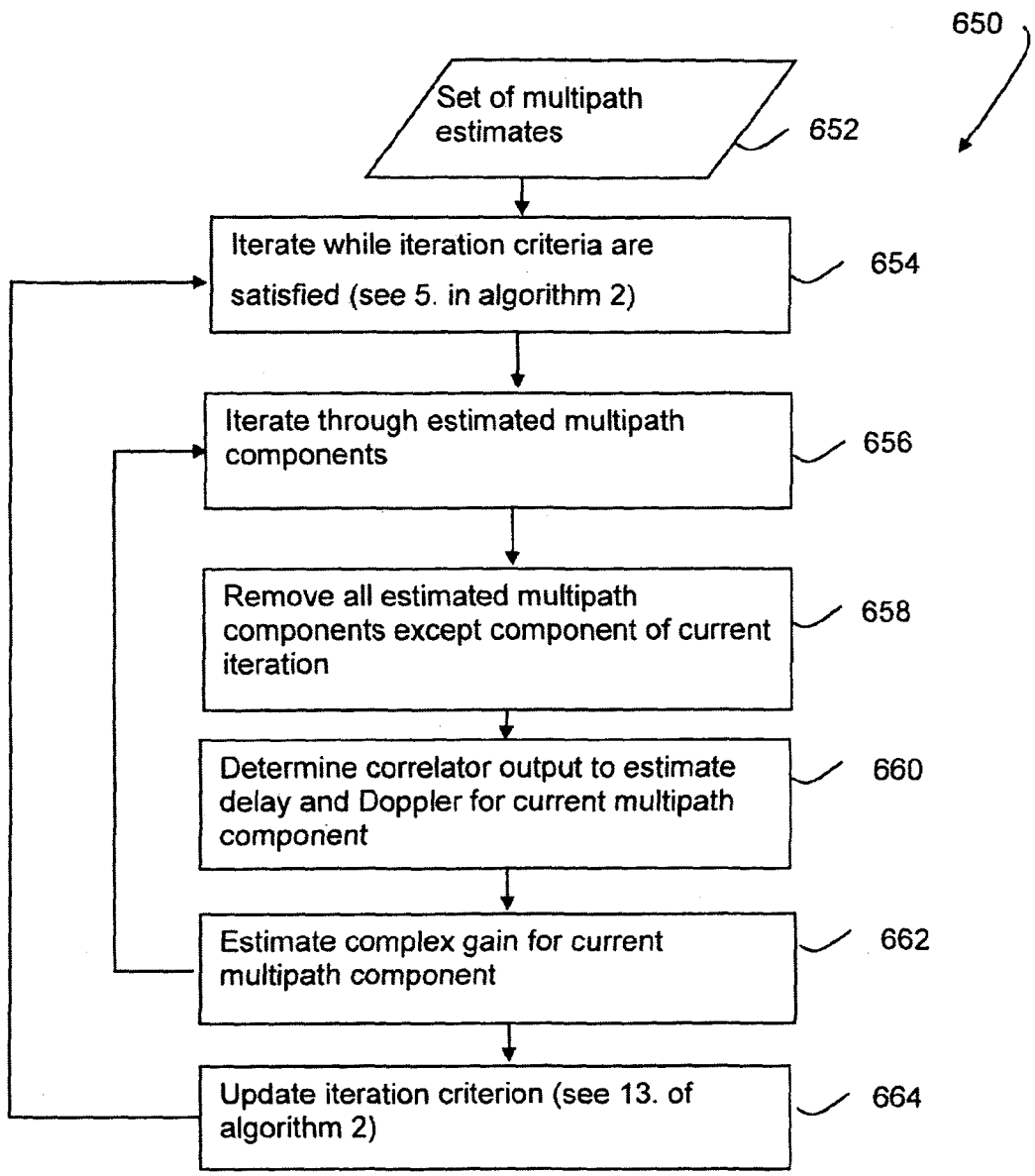
FIG. 6C is a flow diagram of an iterative method for refining a set of multipath estimates.

The inventors have observed that the estimates produced by method 630 may be affected by components that have not been removed. This may lead to some degradation in the delay/Doppler resolution. Method 650 of FIG. 6C may be used to refine a set of estimated multipath components by removing all previously estimated multipath components except for a component of interest.

The input to method 650 is a set of p multipath estimates, for example a set of estimates 652 generated by the modeller 114 using method 630. In step 654 a first iteration is commenced that continues while the criterion set out in point 5 of algorithm 2 below is satisfied. For each of these outer iterations, a further set of iterations commences in step 656, stepping through each of the multipath component estimates in the set p. In step 658 all multipath components are removed except for the component of current interest. Then in step 660 the correlation approach is used to refine the delay and Doppler estimates for the component of current interest. Then a least-squares optimisation refines the estimate of the complex gain for the component of current interest in step 662. Process flow returns to step 656 to step through the remaining estimates.

Once the loop of steps 656-662 is complete, the iteration criterion is updated in step 664 and process flow returns to step 654 to continue the iterative process if appropriate.

More detail on method 650 is shown in algorithm 2 as follows:

Note that in line 7 of algorithm 2, q denotes all elements excluding element q.

---

Algorithm 2 Estimate refinement algorithm.

1: Given p >1 estimates, $\hat{\tau}$, $\hat{v}$ and $\hat{a}$.
2: Set $\Delta_1 = \hat{H} - S(\hat{v})\text{diag}(\hat{a})G(\hat{\tau})$.
3: Set $\|\Delta_0\|^2 = \infty$
4: i = 1
5: while $\|\Delta_i\|^2 - \|\Delta_{i-1}\|^2 > \epsilon$ and $i \leq N_{iter}$ do
6:   for q = 1 to p do
7:     $\Delta_q = \hat{H} - S(\hat{v}_{\bar{q}})\text{diag}(\hat{a}_{\bar{q}})G(\hat{\tau}_{\bar{q}})$.
8:     $(\hat{\tau}_q, \hat{v}_q) = \arg\max_{\tau,v} |s^\dagger(v)\Delta_q g^\dagger(\tau)|$.
9:     Recursively create w and R.
10:     $\hat{a} = R^{-1}w$
11:   end for
12:   i = i + 1
13:   $\Delta_i = \hat{H} - S(\hat{v})\text{diag}(\hat{a})G(\hat{\tau})$
14: end while

---

To perform the maximisation step in line 4 of algorithm 1 and line 8 of algorithm 2, the time domain channel modeller 114 may use the 2-D bisection approach as described in algorithm 3 below.

In its most naive implementation, algorithm 3 has a complexity of ML(N+K) complex multiply-accumulates per iteration. The complexity of line 14 may be reduced by exploiting the radix-2 algorithm.

---

Algorithm 3 2D Bisection Algorithm.

1: Given the initial delay search window: $\tau_{min}, \tau_{max}$.
2: Given the initial Doppler search window: $v_{min}, v_{max}$.
3: Given number of delay and Doppler bins: $M > 1$ and $N > 1$ respectively.
4: Given the search window overlap factor: $\beta > 0$.
5: Given the error difference threshold: $\epsilon > 0$.
6: Given the maximum number of iterations: $N_{Iter}$.
7: Set $i = 0$, $\mu_{-1} = \infty$ and $\mu_o = 0$.
8: while $|\mu_{i-1} - \mu_i| > \epsilon$ and $i < N_{Iter}$ do ---continued Algorithm 3 2D Bisection Algorithm.

9:   Determine delay resolution, $\Delta\tau = \frac{\tau_{max} - \tau_{min}}{M}$.
10:   Determine Doppler resolution, $\Delta v = \frac{v_{max} - v_{min}}{N}$.
11:   Construct delay bins, $\hat{\tau}_m = \tau_{min} + m\Delta\tau$, for $m = 0, \ldots, M - 1$.
12:   Construct Doppler bins, $\hat{v}_n = v_{min} + n\Delta v$, for $n = 0, \ldots, N - 1$.
13:   Construct matrices $G(\hat{\tau})$ and $S(\hat{v})$.
14:   Compute $\Psi = GY^\dagger S$.
15:   Find largest magnitude squared value of $\Psi$ and its indices, i.e.
$\mu_{i+1} = \max_{m,n}|\Psi_{m,n}|^2$ and $(m^*, n^*) = \arg\max_{m,n}|\Psi_{m,n}|^2$.
16:   Update delay window, i.e. $\tau_{min} = \hat{\tau}_{m^*} - \beta\Delta\tau$ and $\tau_{max} = \hat{\tau}_{m^*} + \beta\Delta\tau$.
17:   Update Doppler window, i.e. $v_{min} = \hat{v}_{n^*} - \beta\Delta v$ and $v_{max} = \hat{v}_{n^*} + \beta\Delta v$.
18:   i = i + 1
19: end while

---

4. Performance Evaluation

To examine the performance of our estimation algorithm, we conducted a comprehensive set of Monte Carlo simulations. The assumption is made that P is known a-priori and that the multipath components are sufficiently separated to minimise false/miss detects due to the delay/Doppler resolution.

In all simulations, we assume an OFDM signal similar to the IEEE802.11 standard, with K=64 and 52 active subcarriers, a subcarrier spacing of 156:250 kHz and an OFDM symbol period of 8 μsec.

In these simulation results we assume the number of taps P is known a-priori. Only P iterations of algorithm 1 are performed and the detected taps are subsequently refined using algorithm 2. For each trial the delay/Doppler are drawn randomly, but not independently and identically distributed (i.i.d.). For each trial we chose a vector of P delays by continually drawing a vector P delays from an i.i.d. uniform distribution on the interval $(\tau_{min}, \tau_{max})$ until the minimum distance between the delays is greater than $\Delta\tau$. The delays are then re-arranged in ascending order. Similarly for the Doppler offsets, however no sorting is performed. This allows us to generate the delay and Doppler offset of each tap randomly whilst maintaining a minimum delay/Doppler resolution. Note that $\Delta\tau \leq (\tau_{max}-\tau_{min})/P$ and similarly $\Delta v \leq (v_{max}-v_{min})/P$.

To ensure that the estimator performance is not dominated by the delay/Doppler bin resolution we first consider the P=1 case and compare the root mean squared (RMS) error with the Cramer-Rao lower bound (CRLB) of a 2-D sinusoid in AWGN, i.e. let $r(m, n) = A \exp[-j(w_1 l + w_2 k)] + z(m,n)$, for $l = 0, \ldots L-1$ and $k = 0, \ldots K-1$, where $z(m,n) \sim \mathcal{CN}(0, \sigma^2)$. Then $$\text{var}[\hat{w}_1] \geq \frac{6}{KL(L^2-1)} \frac{\sigma^2}{A^2} \quad (40)$$

$$\text{var}[\hat{w}_2] \geq \frac{6}{KL(K^2-1)} \frac{\sigma^2}{A^2}. \quad (41)$$

For P=1, algorithm 1 is the ML estimator of a 2-D sinusoid in AWGN. To observe this we set $(\tau_{min}, \tau_{max}) = (0, 200)$ nsec and $(v_{min}, v_{max}) = (-500, 500)$ Hz. Results of the simulations are shown in FIG. 7, in which a single-tap estimation root-mean-square (RMS) error for the present estimation techniques (shown in solid circles) is compared to the CR lower bound shown as a dashed line. K=52. The upper curves are for L=128, the middle curves are for L=256 and the bottom curves are for L=512. For the single tap channel the RMS error is very low, e.g. at an SNR of 20 dB with L=256 the RMS delay/Doppler errors are approximately 0.4 nsec and 3.5 Hz respectively.

Now we consider a P=3 tap channel with power delay profile $|\alpha_1|^2=-0.54$, $|\alpha_2|^2=-10.54$ and $|\alpha_3|^2=15.54$ dB. The phase of each tap was chosen uniformly random on $(0.2\pi)$.

Figure 8:
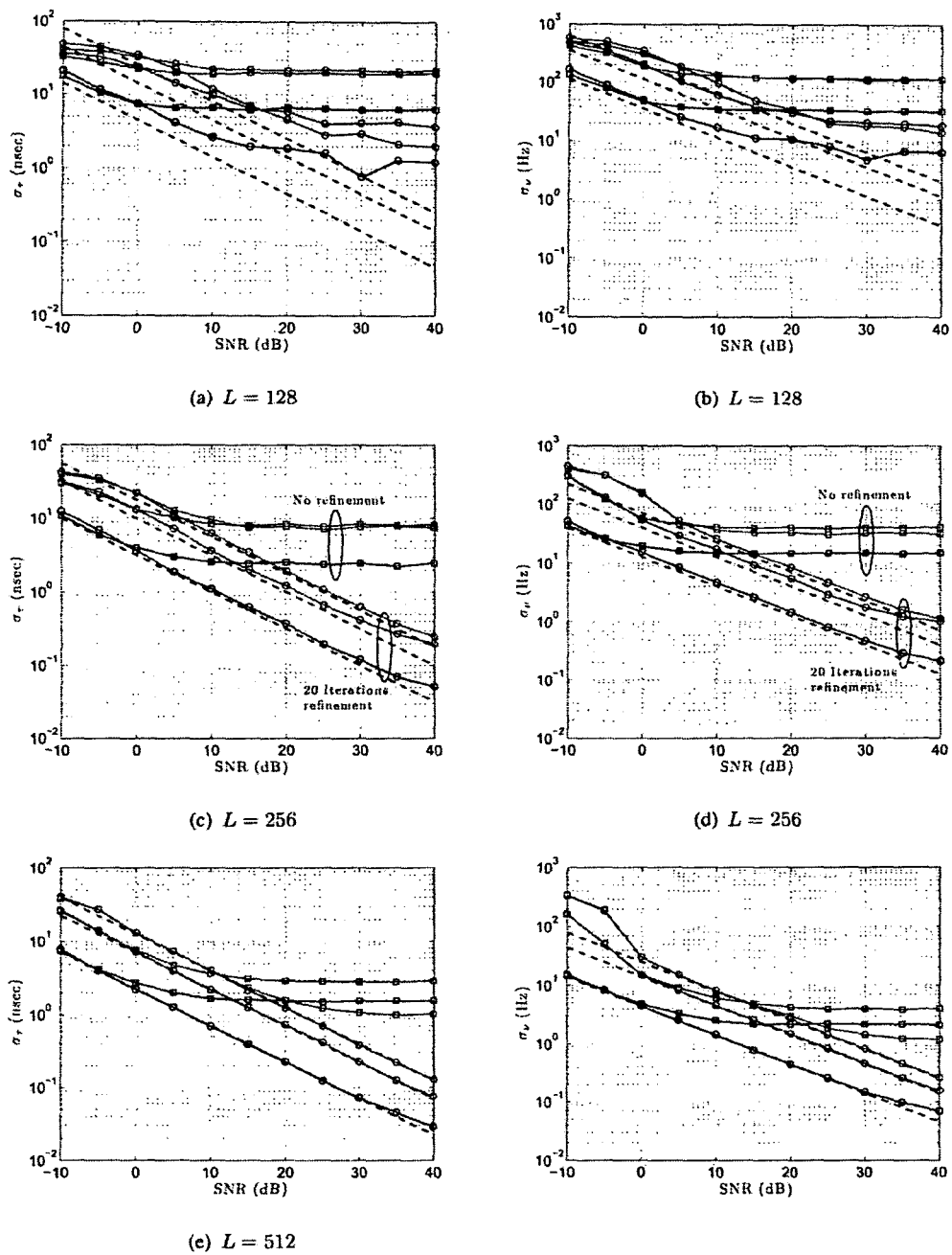
FIG. 8 shows a performance evaluation of the methods of FIG. 6 using Monte Carlo simulations with a three tap channel.

FIG. 8 shows the results of a simulation for the 3-tap estimation. Again, the dashed lines show the CRLB. The solid lines with squares indicate the performance of algorithm 1 only.

Solid lines with circles show the performance of algorithm 1 followed by an application of the refinement algorithm 2 after 20 iterations. It can be seen that the refinement provides a noticeable improvement in accuracy.

For each trial, RMS error statistic's were only collected when all taps are detected, i.e. each tap is closest (in Euclidean distance) to a single estimate. It is possible for a particular tap to be closest to two or more estimated taps. These events are counted as miss-detections, but are not included in the RMS error statistics.

It will be understood that the invention disclosed and defined in this specification extends to all alternative combinations of two or more of the individual features mentioned or evident from the text or the drawings. All these different combinations constitute various alternative aspects of the invention.

The parameter estimation described herein has many applications. In one application the estimates of path delays and Dopplers provides a means of characterising a reflective environment of the communication channel. This approach may, for example, be used in Dedicated Short Range Communications (DSRC) systems. Methods for environment estimation in a wireless communication system are described, for example, in a commonly assigned PCT application PCT/AU2010/000768 claiming priority from Australian provisional application 2009902848 filed 19 Jun. 2009.

It will also be understood that the term "comprises" and its grammatical variants as used in this specification is equivalent to the term "includes" and should not be taken as excluding the presence of other elements or features.

APPENDIX

Derivation of Gain Vector Solution

The following derivation is for the equation used in line 10 of algorithm 2 and line 11 of algorithm 1 (Eq. 35).

We require the solution to $$\hat{a}_p = \underset{a_p}{\operatorname{argmin}} \left\| \hat{H} - S(\hat{v}_p)\operatorname{diag}(a_p)G(\hat{\tau}_p) \right\|^2. \quad (42)$$

First, we rewrite the problem as a least-squares optimisation problem, $$\hat{a}_p = \underset{a_p}{\operatorname{argmin}} \left\| \operatorname{vec}(\hat{H}) - \Omega_p a_p \right\|^2. \quad (43)$$

where vec(M) denotes the vectorize operation, i.e. stacking the columns of the matrix M, and $\Omega_p$ is the KL×p matrix, $$\Omega_p = \begin{pmatrix} g_0(\hat{\tau}_1)s_0(\hat{v}_1) & \cdots & g_0(\hat{\tau}_p)s_0(\hat{v}_p) \\ g_1(\hat{\tau}_1)s_0(\hat{v}_1) & \cdots & g_1(\hat{\tau}_p)s_0(\hat{v}_p) \\ \vdots & \cdots & \vdots \\ g_{K-1}(\hat{\tau}_1)s_0(\hat{v}_1) & \cdots & g_{K-1}(\hat{\tau}_p)s_0(\hat{v}_p) \\ \vdots & \cdots & \vdots \\ g_0(\hat{\tau}_1)s_1(\hat{v}_1) & \cdots & g_0(\hat{\tau}_p)s_1(\hat{v}_p) \\ g_1(\hat{\tau}_1)s_1(\hat{v}_1) & \cdots & g_1(\hat{\tau}_p)s_1(\hat{v}_p) \\ \vdots & \cdots & \vdots \\ g_{K-1}(\hat{\tau}_1)s_1(\hat{v}_1) & \cdots & g_{K-1}(\hat{\tau}_p)s_1(\hat{v}_p) \\ \vdots & \cdots & \vdots \\ g_{K-1}(\hat{\tau}_1)s_{L-1}(\hat{v}_1) & \cdots & g_{K-1}(\hat{\tau}_p)s_{L-1}(\hat{v}_p) \end{pmatrix}. \quad (44)$$

The analytic solution to the least-squares problem (43) is well known [19], $$\hat{a}_p = (\Omega_p' \Omega_p)^{-1} \Omega_p' \operatorname{vec}(\hat{H}).$$

We now let $R_p = \Omega_p^t \Omega_p$, which is a p×p matrix whose m, nth element is given by $$(R_p)_{m,n} = \sum_{l=0}^{L-1}\sum_{k=0}^{K-1} g_k^*(\hat{\tau}_m)s_l^*(\hat{v}_m)g_k(\hat{\tau}_n)s_l(\hat{v}_n) \quad (46)$$

$$= e^{-j\pi(L-1)(\hat{v}_n-\hat{v}_m)T_d} e^{-j\pi(K-1)(\hat{\tau}_n-\hat{\tau}_m)/T} \quad (47)$$

$$\frac{\sin(\pi L(\hat{v}_n - \hat{v}_m)T_d)}{\sin(\pi(\hat{v}_n - \hat{v}_m)T_d)} \frac{\sin(\pi K(\hat{\tau}_n - \hat{\tau}_m)/T)}{\sin(\pi(\hat{\tau}_n - \hat{\tau}_m)/T)}$$

$$\approx KL e^{-j\pi(L-1)(\hat{v}_n-\hat{v}_m)T_d} e^{-j\pi(K-1)(\hat{\tau}_n-\hat{\tau}_m)/T} \quad (48)$$

$$\operatorname{sinc}(\pi L(\hat{v}_n - \hat{v}_m)T_d)\operatorname{sinc}(\pi K(\hat{\tau}_n - \hat{\tau}_m)/T).$$

and $\omega_p = \Omega^t \operatorname{vec}(\hat{H})$ is a column vector whose mth component is given by $$(w_p)_m = \sum_{l=0}^{L-1}\sum_{k=0}^{K-1} \hat{H}_{l,k} g_k^*(\hat{\tau}_m)s_l^*(\hat{v}_m). \quad (49)$$

The invention claimed is:

1. A method of estimating a time-varying multipath OFDM communication channel, the method comprising:
    receiving a frequency-domain channel estimate of the multipath communication channel, the frequency-domain channel estimate deriving from an OFDM data packet transmitted over the multipath communication channel; and, based on the frequency-domain channel estimate generating an estimate of tap parameters in a time-domain model of the multipath communication channel, the time-domain model characterising the multipath communication channel as a delay line with a plurality of taps, each tap having tap parameters defining a delay, a Doppler and a complex gain for the tap,
    wherein the estimated tap parameters are constant for the duration of the data packet.

2. The method of claim 1 wherein said generating the estimate of tap parameters comprises:
    defining a search window for the delay and Doppler tap parameters;
    dividing the search window into a plurality of bins;
    determining a correlator metric for the respective bins;

identifying one or more peaks in the determined correlator metrics; and
outputting estimates of the delay and Doppler tap parameters based on the identified peaks.

3. The method of claim 1 wherein said generating the estimate of tap parameters comprises:
estimating the delay and Doppler tap parameters for a detected multipath component;
performing a least-squares estimation to generate an estimate of the gain tap parameter for the detected multipath component; and
subtracting the detected multipath component from the channel estimate, using the estimated delay, Doppler and gain tap parameters to quantify the detected multipath component.

4. The method of claim 3 wherein said estimating, least-squares estimation and subtraction are repeated to iteratively remove detected multipath components from the channel estimate.

5. The method of claim 1 further comprising a method of refining an estimate of the time-domain model of the multipath communication channel, said refining comprising:
subtracting all of the plurality of multipath components from the estimate of the multipath communication channel except for a currently-considered multipath component;
generating a refined estimate of the delay tap parameter and the Doppler tap parameter for the currently-considered multipath component; and
performing a least-squares estimation to generate a refined estimate of the gain tap parameter for the currently-considered multipath component.

6. The method of claim 5 wherein said refining is repeated to generate refined estimates for the plurality of multipath components.

7. The method according to claim 1 wherein generating the estimate of tap parameters uses an ambiguity function.

8. The method of claim 7 wherein the ambiguity function is described by the following equation:

$$A_x(\tau, v) \approx \frac{1}{KL} e^{-j2\pi \lfloor K/2 \rfloor \tau/T} e^{-j\pi(L-1)vT_d} \frac{\sin(\pi \tau K/T)}{\sin(\pi \tau/T)} \frac{\sin(\pi v T_d L)}{\sin(\pi v T_d)}$$

where $A_x$ represents the ambiguity function, $\tau$ represents delay, $v$ represents frequency, $K$ represents the number of subcarriers, $L$ represents the length of the data packet in OFDM symbols, $1/T$ represents the subcarrier spacing, and $T_d$ represents the OFDM symbol duration.

9. The method of claim 1 further comprising:
providing the channel estimate to a radar application for target detection and/or localisation.

10. The method of claim 1 further comprising:
providing the channel estimate to a signal communication processor for channel characterisation and/or processing of the received signal.

11. The method of claim 7 further comprising:
providing the refined estimates to a radar application for target detection and/or localisation.

12. The method of claim 5 further comprising:
providing the refined estimates to a signal communication processor for channel characterisation and/or processing of the received signal.

13. The method of claim 1 further comprising:
characterising a reflective environment of the communication channels based on the time-domain model of the multipath communication channel.

14. The method of claim 1 further comprising determining the frequency domain estimate, said determining comprising:
estimating data from the data packet; and
using the data as pilot symbols to obtain the frequency domain estimate from a signal received over the multipath communication channel.

15. A computer program product comprising machine-readable program code recorded on a non-transitory machine-readable recording medium, for controlling the operation of a data processing apparatus on which the program code executes to perform the method of claim 1.

16. The method of claim 1, further comprising generating the frequency-domain channel estimate based on feedback from decoder decisions.

17. A non-transitory computer readable medium including instructions for:
receiving a frequency-domain channel estimate of the multipath OFDM communication channel, the frequency-domain channel estimate deriving from an OFDM data packet transmitted over the multipath communication channel; and, based on the frequency-domain channel estimate
generating an estimate of tap parameters in a time-domain model of the multipath communication channel, the time-domain model characterising the multipath communication channel as a delay line with a plurality of taps, each tap having tap parameters defining a delay, a Doppler and a gain for the tap,
wherein the estimated tap parameters are constant for the duration of the data packet.

18. The non-transitory computer readable medium of claim 17 further including instructions for:
defining a search window for the delay and Doppler tap parameters;
dividing the search window into a plurality of bins;
determining a correlator metric for the respective bins;
identifying one or more peaks in the determined correlator metrics; and
outputting estimates of the delay and Doppler tap parameters based on the identified peaks.

19. The non-transitory computer readable medium of claim 17 further including instructions for:
estimating a delay and Doppler tap parameter for a detected multipath component;
performing a least-squares estimation to generate an estimate of the gain tap parameter for the detected tap; and
subtracting the detected multipath component from the channel estimate, using the estimated delay, Doppler and gain tap parameters to quantify the detected multipath component.

20. The non-transitory computer readable medium of claim 19 further including instructions for:
repeating the estimating, least-squares estimation and subtraction to iteratively remove respective multipath components from the channel estimate.

21. The non-transitory computer readable medium of claim 17 further including instructions for:
subtracting all of the plurality of multipath components from the estimate of the multipath communication channel except for a currently-considered multipath component;
generating a refined estimate of the delay tap parameter and the Doppler tap parameter for the currently-considered multipath component; and performing a least-squares estimation to generate a refined estimate of the gain tap parameter for the currently-considered multipath component.

22. The non-transitory computer readable medium of claim 21 further including instructions for:
repeating the steps of subtracting, generating a refined estimate and performing a least-squares estimate as defined in claim 16 to generate refined estimates for the plurality of multipath components.

23. The non-transitory computer readable medium of claim 17 further including instructions for generating the frequency-domain channel estimate based on feedback from decoder decisions.

24. A system for estimating a time-varying multipath communication channel, the system comprising:
a receiver for receiving a signal comprising an OFDM data packet transmitted over the multipath communication channel;
a frequency-domain channel estimator that generates a frequency-domain channel estimate based on the received signal; and
a time-domain channel modeller that receives the frequency-domain channel estimate and generates an estimate of tap parameters in a time-domain model of the multipath communication channel, the model characterising the multipath communication channel as a delay line with a plurality of taps, each tap having tap parameters defining a delay, a Doppler and a gain for the tap, wherein the estimated tap parameters are constant over the duration of the data packet.

25. The system of claim 24 wherein the frequency-domain channel estimator is configured to generate the frequency-domain channel estimate based on feedback from decoder decisions.

26. An apparatus for estimating a time-varying multipath communication channel based on a signal comprising a plurality of multipath components, the signal associated with an OFDM data packet, and based on a frequency-domain channel estimate deriving from the data packet, the apparatus comprising:
a time-domain channel modeller that receives the frequency-domain channel estimate and generates an estimate of tap parameters in a time-domain model of the multipath communication channel, the model characterising the multipath components according to the tap parameters, the tap parameters defining a delay, a Doppler and a gain for the multipath components, wherein the estimated tap parameters are constant over the duration of the data packet.

27. The apparatus of claim 26 wherein the frequency-domain channel estimate is generated based on feedback from decoder decisions.

\* \* \* \* \*